(12) United States Patent
Froggatt et al.

(10) Patent No.: US 10,132,614 B2
(45) Date of Patent: Nov. 20, 2018

(54) DISSIMILAR CORES IN MULTICORE OPTICAL FIBER FOR STRAIN AND TEMPERATURE SEPARATION

(71) Applicant: INTUITIVE SURGICAL OPERATIONS, INC., Sunnyvale, CA (US)

(72) Inventors: Mark Froggatt, Blacksburg, VA (US); Dawn K. Gifford, Blacksburg, VA (US); Stephen T. Kreger, Blacksburg, VA (US); Alexander K. Sang, Christiansburg, VA (US); Jeffrey T. Lacroix, Blacksburg, VA (US); Eric E. Sanborn, Blacksburg, VA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 0 days.

(21) Appl. No.: 15/520,950

(22) PCT Filed: Dec. 7, 2015

(86) PCT No.: PCT/US2015/064213
§ 371 (c)(1),
(2) Date: Apr. 21, 2017

(87) PCT Pub. No.: WO2016/099976
PCT Pub. Date: Jun. 23, 2016

(65) Prior Publication Data
US 2017/0370704 A1    Dec. 28, 2017

Related U.S. Application Data

(60) Provisional application No. 62/091,921, filed on Dec. 15, 2014.

(51) Int. Cl.
*G02B 6/02* (2006.01)
*G01B 11/16* (2006.01)
(Continued)

(52) U.S. Cl.
CPC ............ *G01B 11/161* (2013.01); *G01B 11/18* (2013.01); *G01B 21/042* (2013.01); *G01D 5/344* (2013.01);
(Continued)

(58) Field of Classification Search
CPC .............................. G02B 6/00; G02B 6/02042
See application file for complete search history.

(56) References Cited

U.S. PATENT DOCUMENTS

| 5,563,967 A | 10/1996 | Haake |
| 5,798,521 A | 8/1998 | Froggatt |

(Continued)

FOREIGN PATENT DOCUMENTS

| CA | 2600621 A1 | 3/2008 |
| CA | 2600621 C | 2/2011 |

(Continued)

OTHER PUBLICATIONS

International Preliminary Report on Patentability for Application No. PCT/US2015/064213, dated Jun. 29, 2017, 9 pages.

(Continued)

*Primary Examiner* — Jonathan Hansen
(74) *Attorney, Agent, or Firm* — Schwegman Lundber & Woessner, P.A.

(57) ABSTRACT

An optical fiber includes multiple optical waveguides configured in the fiber. An interferometric measurement system mitigates or compensates for the errors imposed by differences in a shape sensing optical fiber's response to temperature and strain. A 3-D shape and/or position are calculated from a set of distributed strain measurements acquired for a multi-core optical shape sensing fiber that compensates for these non-linear errors using one or more additional cores in the multicore fiber that react differently to temperature changes than the existing cores.

7 Claims, 6 Drawing Sheets

(51) Int. Cl.
G01L 1/24 (2006.01)
G01B 21/04 (2006.01)
G01D 5/34 (2006.01)
G01D 5/353 (2006.01)
G01K 11/32 (2006.01)
G01M 11/00 (2006.01)

(52) U.S. Cl.
CPC ..... G01D 5/35316 (2013.01); G01D 5/35354 (2013.01); G01K 11/3206 (2013.01); G01L 1/242 (2013.01); G01M 11/3172 (2013.01); G01M 11/3181 (2013.01); G02B 6/02042 (2013.01); G02B 6/02057 (2013.01)

(56) References Cited

U.S. PATENT DOCUMENTS

| | | | |
|---|---|---|---|
| 6,545,760 | B1 | 4/2003 | Froggatt et al. |
| 6,566,648 | B1 | 5/2003 | Froggatt |
| 7,512,292 | B2 | 3/2009 | MacDougall et al. |
| 7,538,883 | B2 | 5/2009 | Froggatt |
| 7,772,541 | B2 | 8/2010 | Froggatt et al. |
| 7,781,724 | B2 | 8/2010 | Childers et al. |
| 7,903,908 | B2 | 3/2011 | MacDougall et al. |
| 8,123,400 | B2 | 2/2012 | Andrejco et al. |
| 8,400,620 | B2 | 3/2013 | Froggatt et al. |
| 8,531,655 | B2 | 9/2013 | Klein et al. |
| 8,714,026 | B2 | 5/2014 | Froggatt et al. |
| 8,773,650 | B2 | 7/2014 | Froggatt et al. |
| 2006/0013523 | A1 | 1/2006 | Childlers et al. |
| 2008/0002187 | A1 | 1/2008 | Froggatt |
| 2008/0063337 | A1 | 3/2008 | MacDougall et al. |
| 2009/0225807 | A1 | 9/2009 | MacDougall et al. |
| 2010/0284646 | A1 | 11/2010 | Chiang et al. |
| 2011/0113852 | A1 | 5/2011 | Prisco |
| 2012/0069347 | A1 | 3/2012 | Klein et al. |
| 2012/0281205 | A1 | 11/2012 | Askins |
| 2013/0167502 | A1* | 7/2013 | Wilson .................. B29C 70/025 57/210 |
| 2014/0042306 | A1 | 2/2014 | Hoover et al. |
| 2014/0064680 | A1* | 3/2014 | Register, III ......... G02B 6/4416 385/101 |
| 2014/0320846 | A1 | 10/2014 | Froggatt et al. |
| 2015/0177471 | A1* | 6/2015 | Bringuier ............. G02B 6/4494 385/103 |

FOREIGN PATENT DOCUMENTS

| | | |
|---|---|---|
| EP | 2382496 A2 | 11/2011 |
| EP | 2035792 A4 | 5/2013 |
| EP | 2382496 A4 | 11/2013 |
| WO | WO-2007149230 A2 | 12/2007 |
| WO | WO-2007149230 A3 | 3/2008 |
| WO | WO-2010077902 A2 | 7/2010 |
| WO | WO-2010077902 A3 | 9/2010 |
| WO | WO-2012038784 A1 | 3/2012 |
| WO | WO 2013/136247 | 9/2013 |
| WO | WO-2016122742 A2 | 8/2016 |

OTHER PUBLICATIONS

Kim Y-J., et al., "Measurement of Refractive-Index Variation with Temperature by Use of Long-Period Fiber Gratings," Optics Letters, Optical Society of America, Aug. 1, 2002, vol. 27 (15), pp. 1297-1299.

Othonos A. et al., "Fiber Bragg Gratings: Fundamentals and Applications in Telecommunications and Sensing—Chapter 3: Properties of Fiber Bragg Gratings," Fiber Bragg Gratings, Artech House, 1999, pp. 94-147.

Extended European Search Report for Application No. EP15870690.3, dated May 23, 2018, 8 pages.

International Search Report and Written Opinion of the ISA for PCT/US2015/064213, dated Apr. 26, 2016, 12 pages.

Cavaleiro, P.M. et al., "Simultaneous Measurement of Strain and Temperature Using Bragg Gratings Written in Germanosilicate and Boron-Codoped Germanosilicate Fibers," IEEE Photonics Technology Letters, vol. 11, No. 12, Dec. 1999, pp. 1635-1637.

International Preliminary Report on Patentability chapter II for Application No. PCT/US2015/060104 dated Apr. 24, 2017, 13 pages.

International Search Report for Application No. PCT/US2015/060104 dated Aug. 29, 2016, 3 pages.

Vertut, Jean and Phillipe Coiffet, Robot Technology: Teleoperation and Robotics Evolution and Development, English translation, Prentice-Hall, Inc., Inglewood Cliffs, NJ, USA 1986, vol. 3A, 332 pages.

Written Opinion for Application No. PCT/US2015/060104 dated Aug. 29, 2016, 6 pages.

* cited by examiner

DISSIMILAR CORES IN MULTICORE OPTICAL FIBER FOR STRAIN AND TEMPERATURE SEPARATION

This application is the U.S. national phase of International Application No. PCT/US2015/064213 filed 7 Dec. 2015, which designated the U.S. and claims the benefit of U.S. Provisional Application No. 62/091,921 filed 15 Dec. 2014, the entire contents of each of which are hereby incorporated by reference.

This invention was made with government support under Contract No. 2014-14071000012 awarded by the IARPA. The government has certain rights in the invention.

BACKGROUND

Spun multicore fiber has been used to determine the shape of an optical fiber. A multicore fiber having four cores can be used to separate the deformation of the fiber into two bend angles (pitch and yaw), one twist angle, and the fiber elongation. These four measurements constitute four degrees of freedom. These four measurements (pitch, yaw, twist, and elongation) also represent all of the deformations that can happen to the fiber with relatively small forces.

In fiber optic based shape sensing, a multi-channel distributed strain sensing system is used to detect the change in strain for each of several cores within a multicore optical shape sensing fiber as described in U.S. Pat. No. 8,773,650, incorporated herein by reference. Multiple distributed strain measurements are combined through a system of equations to produce a set of physical measurements including curvature, twist, and axial strain as described in U.S. Pat. No. 8,531,655, incorporated herein by reference. These physical measurements can be used to determine the distributed shape and position of the optical fiber. Temperature can also change the apparent length of the cores and represents a fifth degree of "freedom" in the system. The shape sensing systems described in the above patents do not distinguish between temperature changes along the length of the fiber and axial strain changes along the length of the fiber.

SUMMARY

With respect to the four core fiber described in the Background, adding a fifth core to the multicore fiber provides a separate fifth measurement. However, this fifth measurement is not linearly independent from the other four measurements. So simply adding fifth core to the multicore fiber is not in itself useful for separating temperature from strain in multicore fiber. On the other hand, if the additional fifth core has a different temperature dependence of the index of refraction from the other four cores in the multicore fiber, then the fifth core reacts differently to temperature changes, and therefore, provides an additional, linearly-independent source of information.

In order to increase the accuracy of a shape sensing system, the inventors provide a shape sensing system that mitigates or compensates for the errors imposed by differences in a shape sensing optical fiber's response to temperature and strain. The technology described below calculates a 3-D shape and position from a set of distributed strain measurements acquired for a multi-core optical shape sensing fiber that compensates for these non-linear errors using one or more additional cores in the multicore fiber that react differently to temperature changes than the existing cores.

In example embodiments, the one or more additional cores have a different thermal response as compared to existing four cores in the fiber. In example implementations, the one or more additional cores have a different doping composition that the existing four cores, which produces a different temperature dependence of the index of refraction for the one or more additional cores as compared to that of the existing four cores.

One aspect of the technology includes an optical fiber having multiple first cores having a first thermal response and one or more second cores having a second different thermal response. The multiple first cores and the one or more second cores have different relative positions along a length of the optical fiber. In an example implementation, the multiple first cores and the one or more second cores are helically-twisted along a length of the optical fiber.

The multiple first cores may have a first doping and the one or more second cores have a second different doping. For example, the first doping includes doping only with germanium, and the second doping includes germanium and boron. The boron dopant causes the thermal response of the one or more second cores to differ from the thermal response of the multiple first cores.

The multiple first cores may include a first material associated with the first thermal response, and the one or more second cores may include a second different material associated with the second different thermal response.

In an example implementation, the multiple first cores include four cores, and the one or more second cores include one core. The one core can be preferably spaced within the optical fiber to reduce coupling with the four cores.

In another example implementation, the multiple first cores include four cores, and the one or more second cores include three cores. The three cores can be preferably spaced within the optical fiber symmetrically with respect to each other and to the four cores. The three cores can also be spaced with in the optical fiber to reduce coupling with each other and the four cores.

Another aspect relates to a method for calibrating a spun optical fiber having multiple first cores having a first doping and a first thermal response and one or more second cores having second different doping and a second different thermal response. The optical fiber is placed at least partially in a heated or a cooled environment having a higher or lower temperature that the environment surrounding the heated environment. The optical fiber is strained to varying known levels at different temperatures, and changes in length of the optical fiber for each of the known strain levels are recorded for each of the different temperatures. Calibration parameters for the optical fiber are determined by comparing the recorded changes in length for the optical fiber against previously recorded changes in length for another optical fiber having only the multiple first cores having a first doping.

In an example implementation, a motorized translation stage is used to perform the straining step.

A further aspect of the technology concerns an interferometric measurement system for measuring an optical fiber including multiple first cores configured in the fiber having a first thermal response and one or more second cores configured in the fiber having a second different thermal response. Interferometric detection circuitry is configured to detect measurement interferometric pattern data associated with each of the multiple first cores and each of the one or more second cores when the optical fiber is placed into a sensing position. Data processing circuitry is configured to determine compensation parameters that compensate for variations between a calibration configuration of the multiple cores and the one or more second cores in the optical fiber and an actual configuration of the multiple cores and the one or more second cores in the optical fiber based on the detected measurement interferometric pattern data. The compensation parameters include a temperature compensation parameter. A memory is configured to store the compensation parameters for compensating subsequently-obtained measurement interferometric pattern data for the fiber.

In an example implementation, the data processing circuitry is configured to apply the compensation parameters to the detected measurement interferometric pattern data in order to distinguish between axial strain, bend strain, twist strain, and temperature strain on the optical fiber and to accurately determine strain values for the fiber corresponding to the axial strain, bend strain, twist strain, and temperature strain on the optical fiber. The data processing circuitry may also be configured to apply the compensation parameters to the detected measurement interferometric pattern data and calculate a temperature of the multicore fiber, independent of tension, twist, or bend that may be present in the multicore fiber based on a linear combination of detected strain in the cores.

In an even more specific example implementation, the data processing circuitry is configured to determine a shape of the spun optical fiber based on the determined strain values for the optical fiber corresponding to the axial strain, bend strain, twist strain, and temperature strain on the optical fiber.

DETAILED DESCRIPTION

The following description sets forth specific details, such as particular embodiments for purposes of explanation and not limitation. But it will be appreciated by one skilled in the art that other embodiments may be employed apart from these specific details. In some instances, detailed descriptions of well-known methods, interfaces, circuits, and devices are omitted so as not to obscure the description with unnecessary detail. Individual blocks are shown in the figures corresponding to various nodes. Those skilled in the art will appreciate that the functions of those blocks may be implemented using individual hardware circuits, using software programs and data in conjunction with a suitably programmed digital microprocessor or general purpose computer, and/or using applications specific integrated circuitry (ASIC), and/or using one or more digital signal processors (DSPs). Software program instructions and data may be stored on a non-transitory, computer-readable storage medium, and when the instructions are executed by a computer or other suitable processor control, the computer or processor performs the functions associated with those instructions.

Thus, for example, it will be appreciated by those skilled in the art that diagrams herein can represent conceptual views of illustrative circuitry or other functional units. Similarly, it will be appreciated that any flow charts, state transition diagrams, pseudocode, and the like represent various processes which may be substantially represented in computer-readable medium and so executed by a computer or processor, whether or not such computer or processor is explicitly shown.

The functions of the various illustrated elements may be provided through the use of hardware such as circuit hardware and/or hardware capable of executing software in the form of coded instructions stored on computer-readable medium. Thus, such functions and illustrated functional blocks are to be understood as being either hardware-implemented and/or computer-implemented, and thus, machine-implemented.

In terms of hardware implementation, the functional blocks may include or encompass, without limitation, a digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Example spun or helically-twisted multicore fibers are described below for purposes of illustration and not limitation. The principles described also apply to a multicore fiber where multiple first cores and one or more second cores have different relative positions along a length of the optical fiber.

Because the outer cores of a spun fiber are helically-wrapped, the outer cores also experience strain as a result of a twist applied to the fiber. The outer cores are either elongated or compressed in response to the orientation of the twist to the direction of the helical wrapping. In other words, looking down the axis of the fiber with the outer cores being helically wrapped clockwise, an applied twist in the clockwise direction causes the outer cores to become compressed. Conversely, a counter-clockwise applied twist causes the outer cores to elongate (experience tension). But the center core does not experience strain as a result of twist because it is placed along the neutral axis. Thus, a four-core fiber has sufficient degrees of freedom to allow individual determination of each of three different types of strain that can be applied to the four-core fiber: axially-applied strain, bend-induced strain, and strain as a result of twist or torsion.

Figure 1:
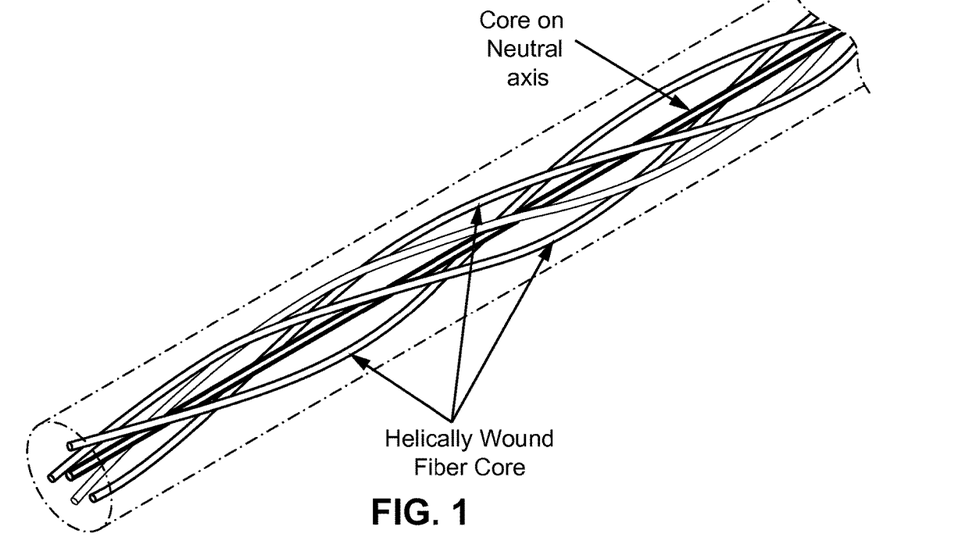
FIG. 1 shows a twisted multicore fiber example embodiment with five cores.

FIG. 1 shows a twisted multicore fiber with five cores. If the 5-core fiber is tensioned, all five of the cores will elongate similarly. If the 5-core fiber is heated, all five of the cores will elongate similarly due to the expansion of the glass and the change in the index of refraction of the glass, which effectively slows the light as the temperature is raised, making the fiber appear longer. So simply adding more cores will not achieve the temperature independent shape sensing objective described above.

A shape sensing system is described below that mitigates or compensates for the errors imposed by differences in a shape sensing optical fiber's response to temperature and strain. To do so, in example embodiments, a fifth core is incorporated having a different temperature dependence from the other four cores in a twisted multicore optical fiber. It should be appreciated that while much of the description below is in the context this five core example, the principles described apply to twisted multicore fibers with different numbers of cores. The fifth or any additional core is preferably located in the fiber in such a way so as to reduce or minimize coupling between cores.

In one example embodiment, the added fifth core has a different thermal dependence by having a different refractive index from that of the other cores. Example ways to achieve that different refractive index include the fifth core being composed of a different material and/or being differently doped. Other ways are possible to achieve a different temperature dependence such as for example locating a fifth core at a different radius (closer or further from the center of the fiber) than the other four cores, providing the fifth core with a different geometry (bigger or smaller than the other cores), etc.

Four of the cores may be doped with germanium, and a fifth core may be co-doped with boron and germanium. Boron doping induces thermal stress in polarization maintaining optical fiber, and as a result, the thermal response of a core containing boron to has a different thermal dependence as compared to typical germanium-doped fiber. Although other dopants may be used to create a different thermal dependence as compared to typically doped fibers in a multicore fiber, boron is also used in example embodiments as a co-dopant with germanium because that co-doping also forms a more photo-sensitive guiding core as compared to typical germanium-doped fiber. Moreover, boron is a relatively common dopant for optical fiber which provides further practical advantages.

Figure 2:
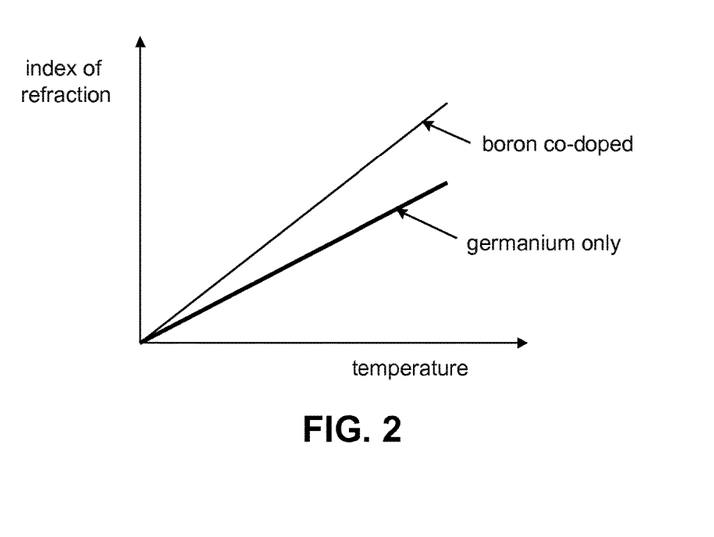
FIG. 2 shows a graph of index of refraction versus temperature for a boron-germanium co-doped core and a germanium only doped core.

FIG. 2 shows a graph of index of refraction versus temperature for a boron-geranium co-doped core and a geranium doped core. As temperature increases the index of refraction for a boron-germanium co-doped core increases at a different (higher) rate than the index of refraction for a typical germanium-doped core. The fifth core reacts differently to temperature changes, and therefore, provides an additional, linearly-independent source of information that is used to compensate for temperature.

Errors and/or uncertainties arise in the determination of fiber position and/or shape—and more generally strain—due to variations in the structure of the multi-core optical fiber. The first category of variation is core placement. This variation causes both the radial separation and the angular position of a given core to differ from designed or desired ideal values or to simply be unknown. A mathematical model is generated that describes the positions of the cores with respect to the cross section of the multi-core fiber such that variations can be quantified.

As glass is a relatively hard material, it can be assumed that the geometry of the cross section of the multi-core fiber is preserved as the fiber is strained. This assures that the relative positions of the cores within a given cross section remain constant as the fiber is strained. This means that the fiber can be strained and still be used to accurately determine variations in core placement from the ideal configuration. A core position model that accounts for variation in core placement is depicted in FIG. 3.

Figure 3:
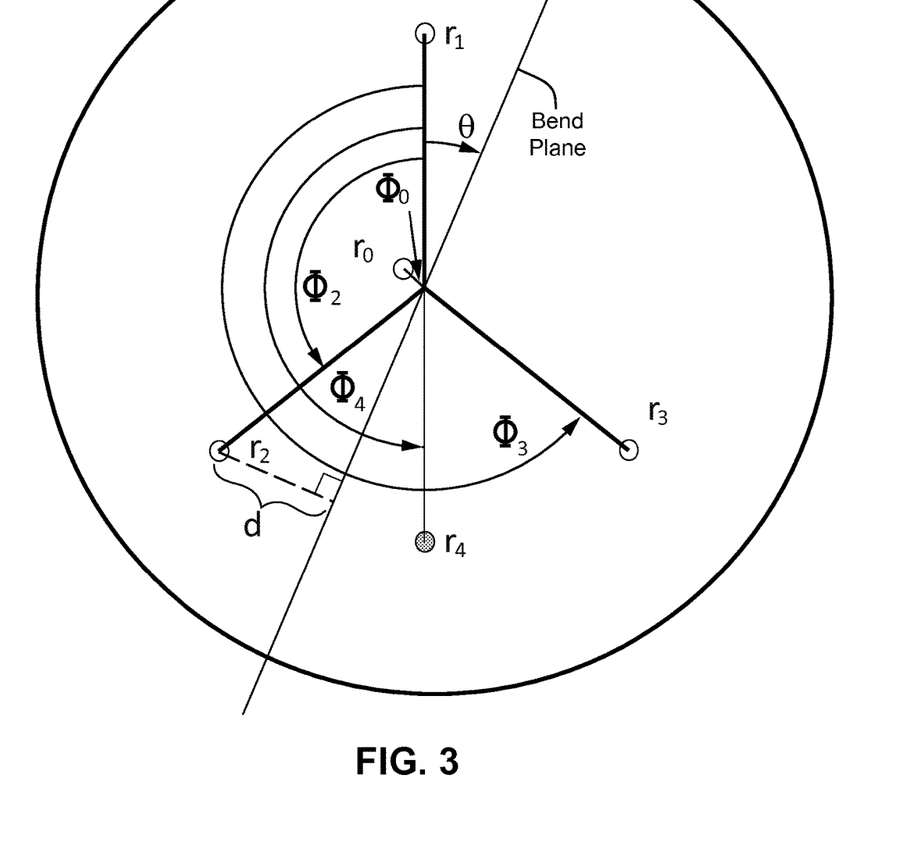
FIG. 3 illustrates mathematical parameters that can be used to quantify core placement and a response to strain for a five core, helically twisted optical fiber.

In FIG. 3, five independent optical cores are shown displaced from their ideal core locations. FIG. 3 also illustrates mathematical parameters that can be used to quantify core placement and a response to strain for a five core, helically twisted optical fiber. A vertical axis is placed through the center of the multi-core fiber such that it passes through one of the outer cores. The outer core that is bisected by the vertical axis is referred to as the "reference core." Note that several parameters will be expressed relative to this core and for the rest of this document the core identified with index n=1 serves as the reference core as an example. Two parameters describe the position of a core: the radial distance from the fiber center, r, and an arbitrary angle φ measured from the established vertical axis intersecting the reference core. As the fiber is bent, the amount of bend-induced strain in a given core is directly proportional to the perpendicular distance d that a core is separated from the bend plane. This is illustrated in the right diagram for the outer core index n=2. If the bend plane is described by the angle θ, the nature of the helical wrapping of the cores within the fiber may be determined. According to distance along the length of the fiber, θ is defined by the spin frequency of the helical fiber.

It is helpful to understand how these parameters impact the three components of the strain profile of the fiber when the core strain responses are recombined. A mathematical model is established based on the parameters shown in FIG. 3. Thus, if these parameters can be measured, they can be used to provide a more accurate recombination of the strain profile of the multi-core optical fiber. It is notable that these parameters need only be measured once for a particular multi-core optical fiber and may be used for some or all OFDR subsequent measurements of that same multi-core optical fiber.

As explained, the strain applied to the multi-core fiber falls into three types or categories: bend-induced strain, strain as a result of torque, and axially-applied strain. The strain response of a core within the fiber possesses a component of these globally-applied strains based on its position in the multi-core fiber. The strain response ε of a core at a distance along the fiber can be represented by equation (1) below:

$$\varepsilon_n = B_n(z) + R_n(z) + A_n(z) \quad (1)$$

in which n designates a core within the fiber, z represents an index along the fiber length, B is the strain experienced by the core due to bending of the fiber, R is the strain induced in the core by twist or torsion applied to the fiber, and A represents axial strain experienced by the core. Compensation for variation in core placement can be achieved by rewriting the expression in equation (1) in terms of the position of the core using the model parameters established in FIG. 3. First, the bend strain B perceived by a core as a result of bending of the fiber can be shown to be proportional to curvature of the bend and the tangential distance of the core to the bend plane (shown in FIG. 3) in Equation (2) below:

$$B_n(z) = \alpha K(z) d(z) \quad (2)$$

in which α is a constant, K is the curvature of the fiber, and d represents the tangential distance of the core from the bend plane. From the model in FIG. 3, the tangential distance can be expressed in terms of the core's position as:

$$d_n(z) = r_n[\sin(\phi_n)\cos(\theta(z)) - \cos(\phi_n)\sin(\theta(z))] \quad (3)$$

in which r is the radial distance from the axis of the fiber, φ represents the angle measured from the vertical axis, and θ is a measure of the angle between the bend plane and the horizontal axis. Combining equations (2) and (3) results in:

$$B_n(z) = \alpha K(z) r_n[\sin(\phi_n)\cos(\theta(z)) - \cos(\phi_n)\sin(\theta(z))] \quad (4)$$

This expression can be simplified by distributing the curvature term and expressing as two separate components:

$$B_n(z) = \alpha r_n[K_x(z)\sin(\phi_n) - K_y(z)\cos(\phi_n)] \quad (5)$$

In which $K_x$ is the curvature about the horizontal axis (pitch) and $K_y$ is the curvature about the vertical axis (yaw).

For moderate levels of twist applied to a fiber (~100 Deg/meter), a first order term can be used to model strain induced by torque. Twist strain $R_n$ (z) is then expressed in terms of the core position as follows:

$$R_n(z) = \beta r_n^2 \Phi(z) \quad (6)$$

in which β is a constant, and Φ is the amount the fiber has twisted (roll), per unit of length. To a first order, it can also be assumed that the axial strain A experienced by the cores is common to all cores within the fiber and is not dependent on the position of the cores arriving at the expression:

$$A_n(z) = \gamma E(z) \quad (7)$$

in which γ is a constant, and E represents axial strain. Rewriting equation (1) in terms of the core positions results in the following expression:

$$\varepsilon_n(z) = \alpha r_n K_x(z)\sin(\phi_n) - \alpha r_n K_y(z)\cos(\phi_n) + \beta r_n^2 \Phi(z) + \gamma E(z) \quad (8)$$

Considering the measured strain signals from the four cores in this example fiber embodiment, a matrix relationship can be constructed as follows:

$$\begin{bmatrix} \varepsilon_0(z) \\ \varepsilon_1(z) \\ \varepsilon_2(z) \\ \varepsilon_3(z) \end{bmatrix} = \begin{bmatrix} \alpha r_0 \sin(\phi_0) & -\alpha r_0 \cos(\phi_0) & \beta r_0^2 & \gamma \\ \alpha r_1 \sin(\phi_1) & -\alpha r_1 \cos(\phi_1) & \beta r_1^2 & \gamma \\ \alpha r_2 \sin(\phi_2) & -\alpha r_2 \cos(\phi_2) & \beta r_2^2 & \gamma \\ \alpha r_3 \sin(\phi_3) & -\alpha r_3 \cos(\phi_3) & \beta r_3^2 & \gamma \end{bmatrix} \begin{bmatrix} K_x(z) \\ K_y(z) \\ \Phi(z) \\ E(z) \end{bmatrix} \quad (9)$$

This expression in equation (9) allows recombination of individual strain signals of each independent core within the shape fiber, according to fiber structure variations, and sorting of these signals into strains that are applied to the entire multi-core fiber structure. Any number of linear combinations can be derived from equation (9) to create expressions that relate the strain response of a core to a component of the strain profile.

If a fifth core is added to the optical fiber with the same composition as all of the others, then the following matrix is produced:

$$\begin{bmatrix} \varepsilon_0 \\ \varepsilon_1 \\ \varepsilon_2 \\ \varepsilon_3 \\ \varepsilon_4 \end{bmatrix} = \begin{bmatrix} \alpha r_0 \sin(\phi_0) & -\alpha r_0 \cos(\phi_0) & \beta r_0^2 & \gamma & t \\ \alpha r_1 \sin(\phi_1) & -\alpha r_1 \cos(\phi_1) & \beta r_1^2 & \gamma & t \\ \alpha r_2 \sin(\phi_2) & -\alpha r_2 \cos(\phi_2) & \beta r_2^2 & \gamma & t \\ \alpha r_3 \sin(\phi_3) & -\alpha r_3 \cos(\phi_3) & \beta r_3^2 & \gamma & t \\ \alpha r_4 \sin(\phi_4) & -\alpha r_4 \cos(\phi_4) & \beta r_4^2 & \gamma & t \end{bmatrix} \begin{bmatrix} K_x \\ K_y \\ \Phi \\ E \\ T \end{bmatrix} \quad (10)$$

The matrix in equation (10) is not invertible because the last two columns are identical. This is the mathematical way of stating that because all of the cores respond the same to both temperature and strain. However, changing the composition of the fifth core, produces the following matrix:

$$\begin{bmatrix} \varepsilon_0 \\ \varepsilon_1 \\ \varepsilon_2 \\ \varepsilon_3 \\ \varepsilon_4 \end{bmatrix} = \begin{bmatrix} \alpha r_0 \sin(\phi_0) & -\alpha r_0 \cos(\phi_0) & \beta r_0^2 & \gamma_g & t_g \\ \alpha r_1 \sin(\phi_1) & -\alpha r_1 \cos(\phi_1) & \beta r_1^2 & \gamma_g & t_g \\ \alpha r_2 \sin(\phi_2) & -\alpha r_2 \cos(\phi_2) & \beta r_2^2 & \gamma_g & t_g \\ \alpha r_3 \sin(\phi_3) & -\alpha r_3 \cos(\phi_3) & \beta r_3^2 & \gamma_g & t_g \\ \alpha r_4 \sin(\phi_4) & -\alpha r_4 \cos(\phi_4) & \beta r_4^2 & \gamma_b & t_b \end{bmatrix} \begin{bmatrix} K_x \\ K_y \\ \Phi \\ E \\ T \end{bmatrix} \quad (11)$$

The matrix H in equation (11) is invertible, and temperature can now be determined if the apparent strains $\varepsilon_0$-$\varepsilon_4$ are measured in all five cores.

In a practical example embodiment, to find the strain (E) and temperature (T) independently, the other three parameters (twist (Φ), bend-x ($K_x$), and bend-y ($K_y$)) are determined, and the fiber is calibrated for all of these effects.

The calibration begins by determining the core geometries (radii and angles) for all five cores, (see FIG. 3), and then suspending the fiber inside a tube furnace or other suitable temperature-controlled environment. By measuring the strain in the cores at different temperatures and different strains, values for the parameters $\gamma_g$, $\gamma_b$, $t_g$, and $t_b$, for equation (11) are determined. The five core optical sensing fiber is calibrated with an additional set of data taken with the fiber under tension, and one more set of data with the fiber heated. From these data sets, the matrix in equation (11) is determined for calculating fiber pitch ($K_x$), yaw ($K_y$), twist (Φ), strain (E), and temperature (T) from the OFDR measurements for the five cores.

$$\begin{bmatrix} \text{pitch} \\ \text{yaw} \\ \text{twist} \\ \text{strain} \\ \text{temperature} \end{bmatrix} = \overline{H} \begin{bmatrix} \varepsilon_0 \\ \varepsilon_1 \\ \varepsilon_2 \\ \varepsilon_3 \\ \varepsilon_4 \end{bmatrix} \quad (12)$$

Keeping in mind the matrix H relating the five low-force stimuli (temperature and tension) to the strains $\varepsilon_0$-$\varepsilon_4$ in the five cores defined in equation (11), the fiber is placed in a continuous bend in a plane. Once the fiber is placed in this configuration, a multiple channel OFDR system measures the distributed strain response of each of the cores within the multi-core optical fiber. The resulting strain response signal typically alternates between compression and elongation at a frequency that matches the spin frequency of the helical wrapping of an outer core as it proceeds through a bend. The magnitude of this oscillation should also be slowly varying along the length of the fiber as this magnitude will be proportional the bend radius of the loop described above.

These strain responses are then provided to one or more data processors for extraction of the parameters that quantify variation from an ideal fiber structure.

To determine the core location, a complex-valued signal with both amplitude and phase is determined from the real-valued strain response provided by the OFDR system. A Fourier transform allows a filter to be applied to the measured scatter signal at the spin frequency of the helical wrapping. An inverse Fourier transform of this filtered signal produces a complex-valued spin signal. The amplitude of this complex spin signal is proportional to the radial separation distance of the core from the neutral center axis of the fiber. The phase response of the complex spin signal is based on the angular position of the core within the geometry of the fiber and is labeled $\phi$ in the model shown in FIG. 7. Comparing the complex spin signal of a core to the spin signal of a reference core determines that core's position relative to the reference core. Thus, all angular positions can be found relative to the vertical axis that bisects the reference core by extracting the argument of a complex quotient between a core's spin signal and the reference core spin signal. Extracting the amplitude provides a ratio measurement of radial separation of the core relative to the reference core.

From this, the matrix below is populated, where the magnitude of the bend response is still unknown because the bend amplitude of the fiber in the spiral in-plane configuration (X and Y) is still not known.

$$\begin{bmatrix} \varepsilon_0 \\ \varepsilon_1 \\ \varepsilon_2 \\ \varepsilon_3 \\ \varepsilon_4 \end{bmatrix} = \begin{bmatrix} \alpha Y_0 & -\alpha X_0 & 0 & 0 & 0 \\ \alpha Y_1 & -\alpha X_1 & 0 & 0 & 0 \\ \alpha Y_3 & -\alpha X_2 & 0 & 0 & 0 \\ \alpha Y_3 & -\alpha X_3 & 0 & 0 & 0 \\ \alpha Y_4 & -\alpha X_4 & 0 & 0 & 0 \end{bmatrix} \begin{bmatrix} K_x \\ K_y \\ \Phi \\ E \\ T \end{bmatrix} \quad (13)$$

A twist is applied to the fiber without changing its shape. From this the response of each core to twist alone (R) may be determined.

$$\begin{bmatrix} \varepsilon_0 \\ \varepsilon_1 \\ \varepsilon_2 \\ \varepsilon_3 \\ \varepsilon_4 \end{bmatrix} = \begin{bmatrix} \alpha Y_0 & -\alpha X_0 & R_0 & 0 & 0 \\ \alpha Y_1 & -\alpha X_1 & R_1 & 0 & 0 \\ \alpha Y_3 & -\alpha X_2 & R_2 & 0 & 0 \\ \alpha Y_3 & -\alpha X_3 & R_3 & 0 & 0 \\ \alpha Y_4 & -\alpha X_3 & R_4 & 0 & 0 \end{bmatrix} \begin{bmatrix} K_x \\ K_y \\ \Phi \\ E \\ T \end{bmatrix}$$

Putting the fiber into a known bend provides known amplitudes for the bend coefficients (B).

$$\begin{bmatrix} \varepsilon_0 \\ \varepsilon_1 \\ \varepsilon_2 \\ \varepsilon_3 \\ \varepsilon_4 \end{bmatrix} = \begin{bmatrix} BY_0 & -BX_0 & R_0 & 0 & 0 \\ BY_1 & -BX_1 & R_1 & 0 & 0 \\ BY_3 & -BX_2 & R_2 & 0 & 0 \\ BY_3 & -BX_3 & R_3 & 0 & 0 \\ BY_4 & -BX_3 & R_4 & 0 & 0 \end{bmatrix} \begin{bmatrix} K_x \\ K_y \\ \Phi \\ E \\ T \end{bmatrix}$$

Putting the fiber in a straight line tension (G) allows a determination of the response of each core to the tension (G).

$$\begin{bmatrix} \varepsilon_0 \\ \varepsilon_1 \\ \varepsilon_2 \\ \varepsilon_3 \\ \varepsilon_4 \end{bmatrix} = \begin{bmatrix} BY_0 & -BX_0 & R_0 & G_0 & 0 \\ BY_1 & -BX_1 & R_1 & G_1 & 0 \\ BY_3 & -BX_2 & R_2 & G_2 & 0 \\ BY_3 & -BX_3 & R_3 & G_3 & 0 \\ BY_4 & -BX_3 & R_4 & G_4 & 0 \end{bmatrix} \begin{bmatrix} K_x \\ K_y \\ \Phi \\ E \\ T \end{bmatrix}$$

Elevate the temperature of the fiber allows determination of the temperature response (T) of each core.

$$\begin{bmatrix} \varepsilon_0 \\ \varepsilon_1 \\ \varepsilon_2 \\ \varepsilon_3 \\ \varepsilon_4 \end{bmatrix} = \begin{bmatrix} BY_0 & -BX_0 & R_0 & G_0 & T_0 \\ BY_1 & -BX_1 & R_1 & G_1 & T_1 \\ BY_3 & -BX_2 & R_2 & G_2 & T_2 \\ BY_3 & -BX_3 & R_3 & G_3 & T_3 \\ BY_4 & -BX_3 & R_4 & G_4 & T_4 \end{bmatrix} \begin{bmatrix} K_x \\ K_y \\ \Phi \\ E \\ T \end{bmatrix}$$

This completes the matrix relating the individual core responses to the aggregate linear effects of Pitch, Yaw, Twist, Tension, and Temperature. If the temperature and tension responses are linearly independent, this matrix will have a well-defined inverse.

$$\begin{bmatrix} BY_0 & -BX_0 & R_0 & G_0 & T_0 \\ BY_1 & -BX_1 & R_1 & G_1 & T_1 \\ BY_3 & -BX_2 & R_2 & G_2 & T_2 \\ BY_3 & -BX_3 & R_3 & G_3 & T_3 \\ BY_4 & -BX_3 & R_4 & G_4 & T_4 \end{bmatrix}^{-1} \begin{bmatrix} \varepsilon_0 \\ \varepsilon_1 \\ \varepsilon_2 \\ \varepsilon_3 \\ \varepsilon_4 \end{bmatrix} = \begin{bmatrix} K_x \\ K_y \\ \Phi \\ E \\ T \end{bmatrix}$$

Using this inverse matrix permits all five independent stimuli to be extracted from the five cores.

Figure 4:
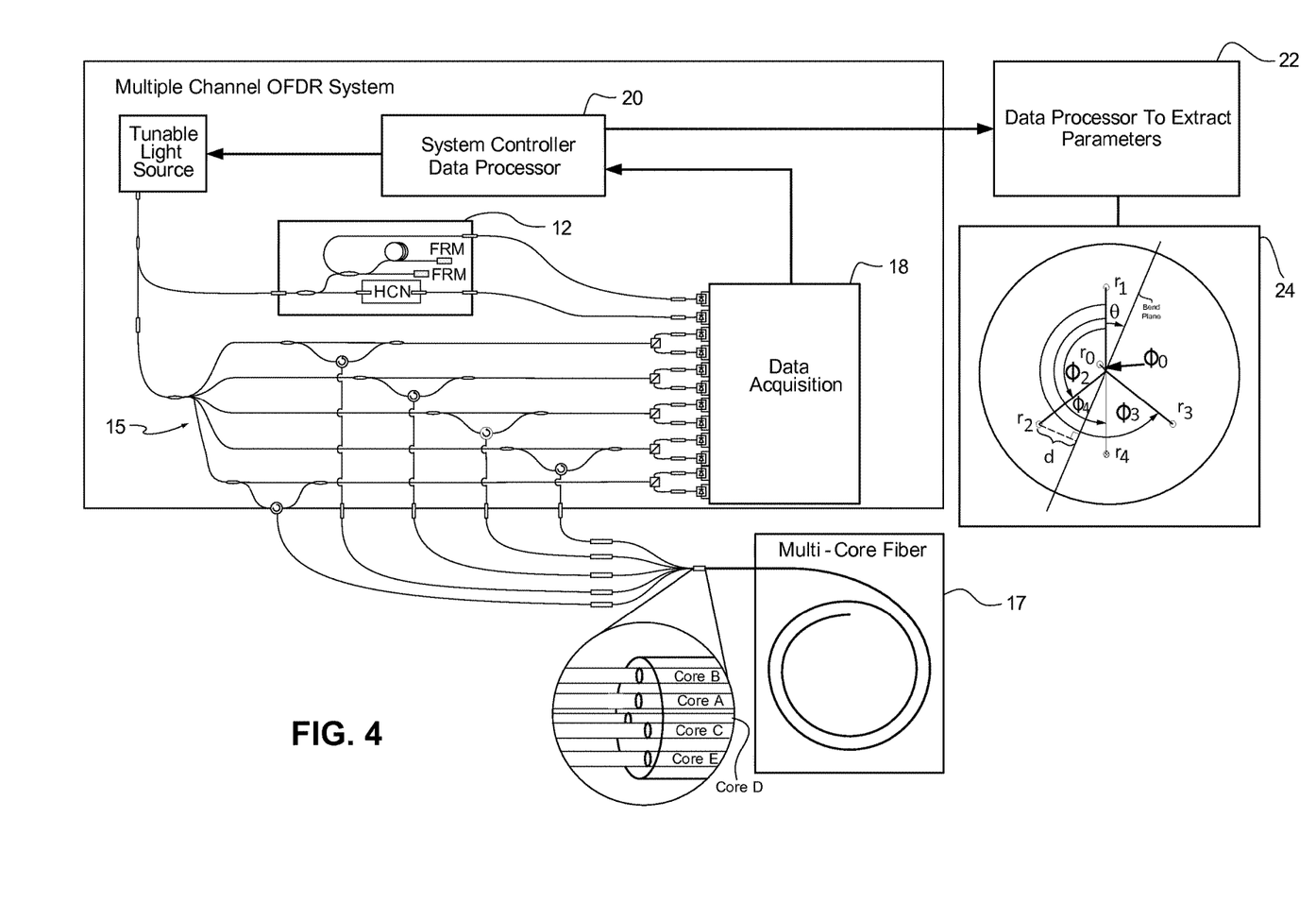
FIG. 4 shows a schematic diagram of an example embodiment of an optical frequency domain reflectometry (OFDM)-based shape sensing system that compensates for non-linear errors such as those caused by temperature based on a five core optical fiber example.

FIG. 4 shows a schematic diagram of an example embodiment of an optical frequency domain reflectometry (OFDM)-based shape sensing system that compensates for non-linear errors such as those caused by temperature based on a five core optical fiber example.

An OFDR-based distributed strain sensing system includes a light source, an interferometric interrogator, a laser monitor network, an optical fiber sensor, acquisition electronics, and a data processor. A single channel corresponds to a single fiber core. During an OFDR measurement, a tunable light source is swept through a range of optical frequencies. This light is split with the use of optical couplers and routed to separate interferometers. A laser monitor network 12 contains a Hydrogen Cyanide (HCN) gas cell that provides an absolute wavelength reference throughout the measurement scan. An interferometer within a laser monitor network 12 is used to measure fluctuations in tuning rate as the light source is scanned through a frequency range.

Interferometric interrogators 15 (also "interferometers 15") are connected to respective individual cores in a length of multicore shape sensing fiber 17. Light enters the sensing fiber 17 through the measurement arms of the five interferometric interrogators referenced generally at 15 corresponding to five core waveguides A, B, C, D, and E in the fiber 17. Scattered light from each core the sensing fiber 17 is then interfered with light that has traveled along the reference arm of the corresponding interferometric interrogator 15. Although the term core is used, the technology applies to other types of waveguides that can be used in a spun fiber. Each pairing of an interferometric interrogator with a waveguide in the multi-core fiber is referred to as an acquisition channel. As the tunable light source 10 is swept, each channel is simultaneously measured, and the resulting interference pattern from each channel is routed to the data acquisition electronics 18 (also "data acquisition unit 18") adapted for the additional interferometric interrogators 15. Each channel is processed independently and identically.

A series of optical detectors (e.g., photodiodes) convert the light signals from the laser monitor network, gas cell, and the interference patterns from each core from the sensing fiber to electrical signals. One or more data processors in a data acquisition unit 18 uses the information from the laser monitor network 12 to resample the detected interference patterns of the sensing fiber 16 so that the patterns possess increments constant in optical frequency. This step is a mathematical requisite of the Fourier transform operation. Once resampled, a Fourier transform is performed by the system controller 20 to produce a light scatter signal in the temporal domain. In the temporal domain, the amplitudes of the light scattering events are depicted verses delay along the length of the fiber. Using the distance that light travels in a given increment of time, this delay can be converted to a measure of length along the sensing fiber. In other words, the light scatter signal indicates each scattering event as a function of distance along the fiber. The sampling period is referred to as the spatial resolution and is inversely proportional to the frequency range that the tunable light source 10 was swept through during the measurement. As the fiber is strained, the local light scatters shift as the fiber changes in physical length. These distortions are highly repeatable. Hence, an OFDR measurement of detected light scatter for the fiber can be retained in memory that serves as a reference pattern of the fiber in an unstrained state. A subsequently measured scatter signal when the fiber is under strain may then be compared to this reference pattern by the system controller 20 to gain a measure of shift in delay of the local scatters along the length of the sensing fiber. This shift in delay manifests as a continuous, slowly varying optical phase signal when compared against the reference scatter pattern. The derivative of this optical phase signal is directly proportional to change in physical length of the sensing core. Change in physical length may be scaled to strain thereby producing a continuous measurement of strain along the sensing fiber.

The data processor 22 coupled to the system controller 20 extracts parameters 24 relating to the actual physical configuration of the cores A, B, C, D, and E in fiber 17 that are used to calibrate or otherwise compensate the OFDR measurements to account for the variations between the actual optical core configuration and an optimal optical core configuration. The mathematical model described in detail above is first established that depicts parameters that describe variations from an optimal multi-core fiber configuration, where the term "optimal" includes known and unknown configurations. Parameters are then defined that compensate for variation in the physical properties of the optical cores within the multi-core fiber.

Figure 5:
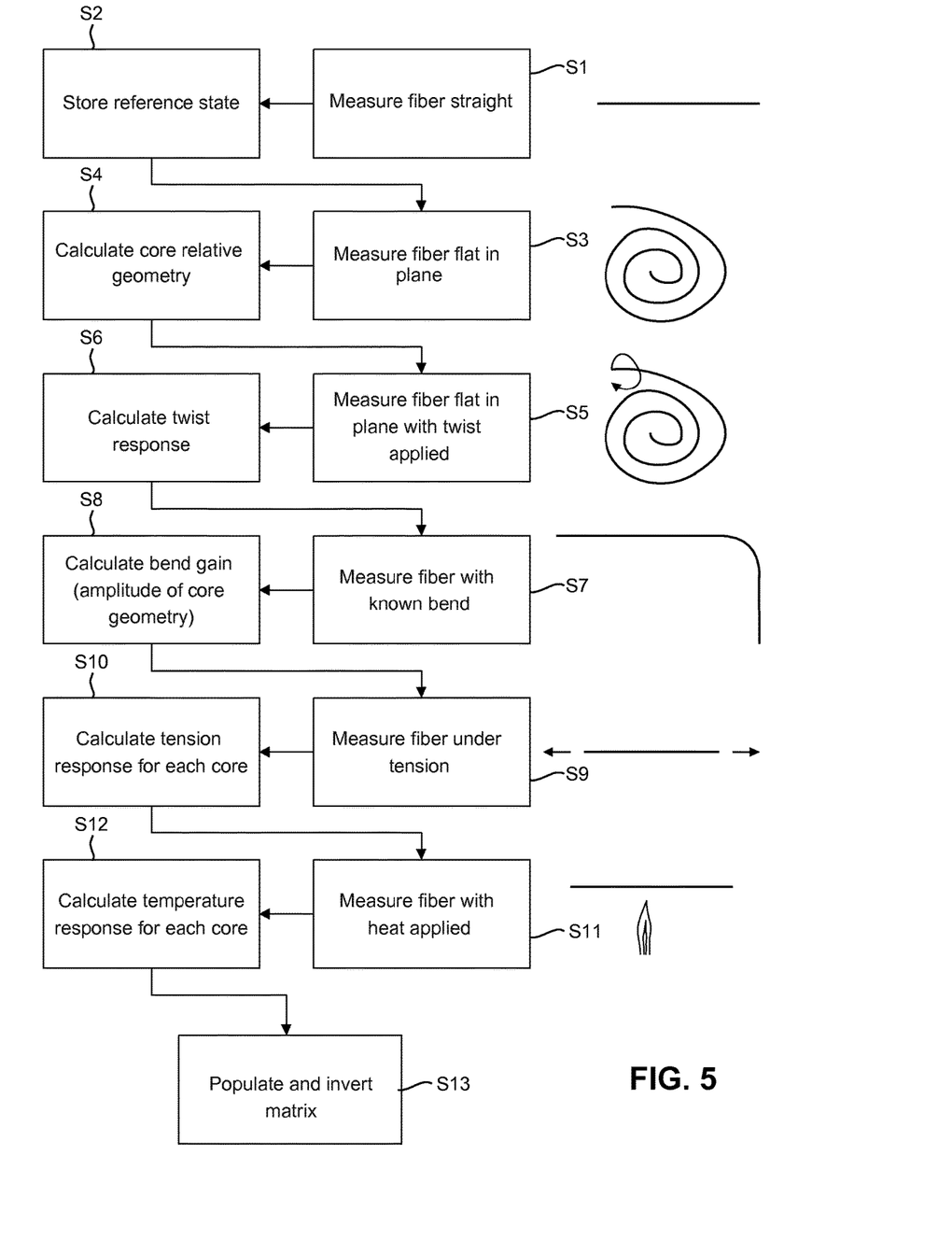
FIG. 5 is a flowchart diagram for calibrating a five core optical shape sensing fiber.

FIG. 5 is a flowchart diagram for calibrating a five core optical shape sensing fiber. Initially, the multicore fiber is placed in a straight line, unstrained configuration, an OFDR measurement is performed (step S1) as described above, and the resulting reference state parameters are stored (step S2). The multicore fiber is then configured in a spiral shape in a flat plane (step S3) to calculate the relative geometry between the cores in the fiber (step S4). A twist is applied in this configuration (step S5), and a twist response is determined (step S6). The fiber is then configured into a known bend position (step S7), and a bend gain is calculated that provides amplitude values of the core geometry (step S8). The fiber is placed under tension (step S9), and a tension response for each core calculated (step S10). The fiber is then exposed to increased temperature in a temperature controlled environment (see the example in FIG. 6) (step S11), and a temperature response is calculated for each core (step S12). The values needed to populate the matrix H described above are then available (step S13), and that matrix H is inverted and used to compensate for temperature in shape sensing applications using that shape sensing fiber.

Figure 6:
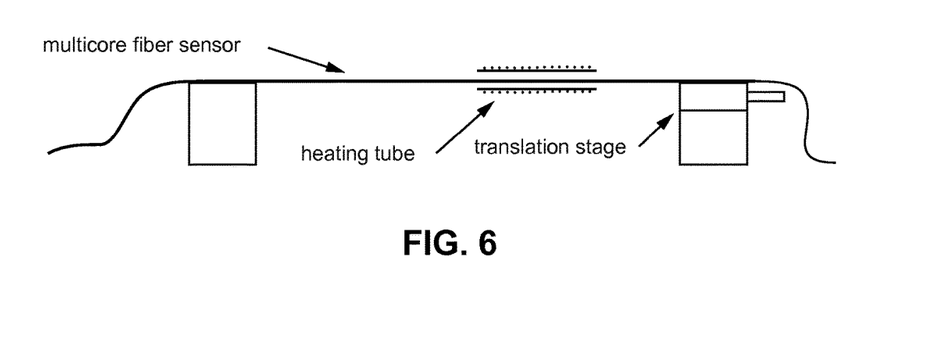
FIG. 6 is a schematic diagram showing an example fiber heating arrangement for heating an optical shape sensing fiber.

FIG. 6 is a schematic diagram showing an example fiber heating arrangement for heating an optical shape sensing fiber. For calibration, the fiber is partially located inside a heated tube. A translation stage is used to strain the fiber to varying, but known levels, and the heating tube can be used to change the temperature of the fiber without contacting it. In one example implementation, it is assumed that temperature and strain dependence is uniform over the entire fiber and so only a portion of the fiber is calibrated for temperature and strain. Of course, a relatively large region may be calibrated to provide better sensitivity.

Figure 7:
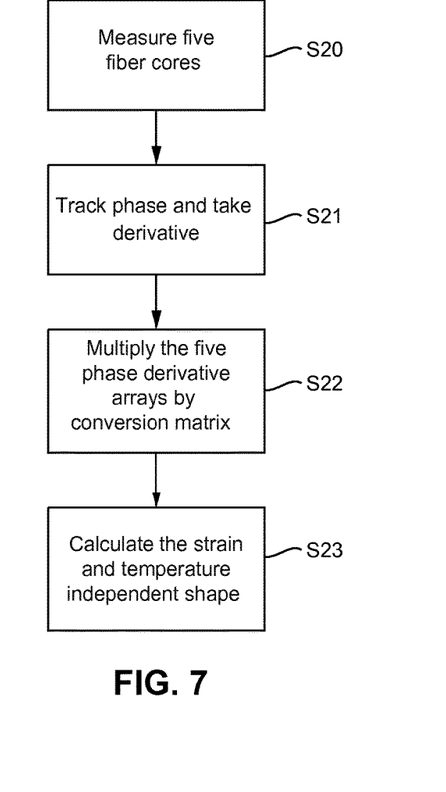
FIG. 7 is a flowchart diagram for shape sensing using the shape sensing system of FIG. 4 that compensates for temperature.

FIG. 7 is a flowchart diagram for shape sensing using the shape sensing system of FIG. 4 and a calibrated shape sensing fiber having five cores that compensates for temperature. Initially, the calibrated shape sensing fiber is placed as desired for shape sensing, and OFDR scatter measurements are obtained for each of the five cores (step S20). The data processor 22 tracks the optical phase signal for each core determined from these scatter measurements as compared to the calibrated reference scatter patterns for each corresponding core for this fiber. Each of the optical phase signals is a measure of shift in delay of the local scatters along the length of its respective core in the sensing fiber. The derivative of this optical phase signal is calculated (step S21) which is directly proportional to change in physical length of its respective core. Each of the five phase derivatives is multiplied by the inverted matrix $G=H^{-1}$ (step S22) to calculate a strain and temperature independent shape (step S23).

In other words, the strain in a particular core is proportional to the derivative of phase tracked in that core. The process of calculating the inverse of H produces the coefficients for each core such that calculate the bend, twist, temp, etc. may be calculated fully independent of all of the other parameters. For example, the bend in the x direction (yaw) is calculated by multiplying the phase derivatives from each of cores by an entry from the inverted matrix and summing them.

$$\begin{bmatrix} K_x \\ K_y \\ \Phi \\ E \\ T \end{bmatrix} = \begin{bmatrix} g_{00} & g_{01} & g_{02} & g_{03} & g_{04} \\ g_{10} & g_{11} & g_{12} & g_{13} & g_{14} \\ g_{20} & g_{21} & g_{22} & g_{23} & g_{24} \\ g_{30} & g_{31} & g_{00} & g_{33} & g_{34} \\ g_{40} & g_{41} & g_{42} & g_{43} & g_{44} \end{bmatrix} \begin{bmatrix} \varepsilon_0 \\ \varepsilon_1 \\ \varepsilon_2 \\ \varepsilon_3 \\ \varepsilon_4 \end{bmatrix}$$

$$\varepsilon = k \frac{d\phi}{dz}$$

$$K_x(z) = \left( g_{00} \frac{d\phi_0}{dz} + g_{01} \frac{d\phi_1}{dz} + g_{02} \frac{d\phi_2}{dz} + g_{03} \frac{d\phi_3}{dz} + g_{04} \frac{d\phi_4}{dz} \right) k$$

k can be absorbed into the matrix to simplify the calculation.

Figure 8:
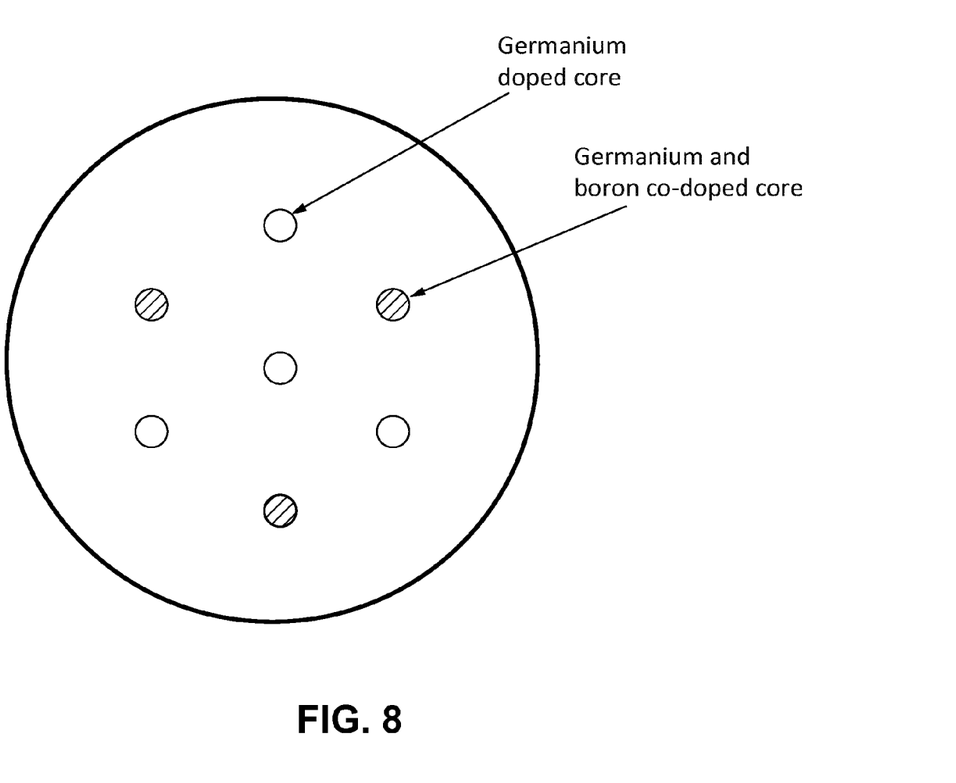
FIG. 8 shows a cross section of a multicore fiber example embodiment with seven cores.

FIG. 8 shows a cross section of a multicore fiber example embodiment with seven cores. In order to maintain fiber symmetry, three cores co-doped with boron are added to the fiber. These additional cores are arranged as shown in the FIG. 8.

Although various embodiments have been shown and described in detail, the claims are not limited to any particular embodiment or example. The technology fully encompasses other embodiments which may become apparent to those skilled in the art. Reference to an element in the singular is not intended to mean "one and only one" unless explicitly so stated, but rather "one or more." None of the above description should be read as implying that any particular element, step, range, or function is essential such that it must be included in the claims scope. The scope of patented subject matter is defined only by the claims. The extent of legal protection is defined by the words recited in the claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke paragraph 6 of 35 USC § 112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. An optical fiber comprising:
   multiple first cores including at least four first cores having a first thermal response; and
   one or more second cores having a second thermal response, the second thermal response different from the first thermal response,
   wherein the multiple first cores and the one or more second cores have different relative positions along a length of the optical fiber, wherein the multiple first cores and the one or more second cores are helically-twisted along a length of the optical fiber, and wherein a cross-section of the optical fiber along the length of the optical fiber is round.

2. The optical fiber in claim 1, wherein the multiple first cores have a first doping and the one or more second cores have a second doping, the second doping different from the first doping.

3. The optical fiber in claim 2, wherein the first doping includes doping only with germanium, and the second doping includes doping with germanium and boron, wherein the boron causes the second thermal response of the one or more second cores to differ from the first thermal response of the multiple first cores.

4. The optical fiber in claim 1, wherein the one or more second cores include three second cores.

5. The optical fiber in claim 4, wherein the three second cores are spaced within the optical fiber symmetrically with respect to each other and to the four first cores.

6. The optical fiber in claim 1, wherein the one or more second cores differ from each of the at least four first cores in a core geometry.

7. The optical fiber of claim 1, wherein the one or more second cores are spaced within the optical fiber to reduce coupling with the at least four first cores.

* * * * *